D. E. Merrick.
Screw Propeller.
Nº 20,953.    Patented Jul. 20, 1858.

N. PETERS, PHOTO-LITHOGRAPHER, WASHINGTON, D. C.

UNITED STATES PATENT OFFICE.

D. E. MERRICK, OF CLEVELAND, OHIO.

PROPELLER.

Specification of Letters Patent No. 20,953, dated July 20, 1858.

*To all whom it may concern:*

Be it known that I, DATUS E. MERRICK, of Cleveland, in the county of Cuyahoga and State of Ohio, have invented new and useful Improvements in Propeller-Wheels for Vessels; and I do hereby declare that the following is a full and complete description of the construction and operation of the same, reference being had to the accompanying drawings, making part of this specification.

Figure 2:
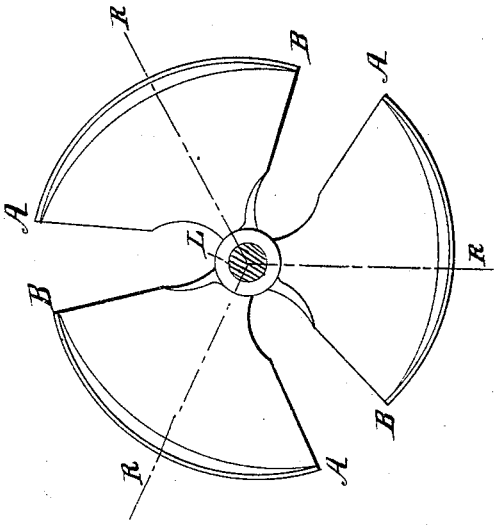
Figure 4:
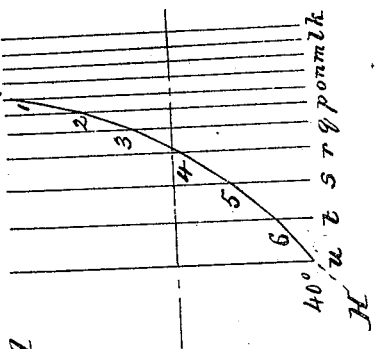
Figure 1:
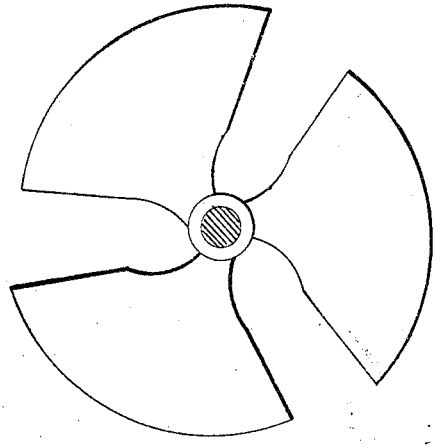
Figure 3:
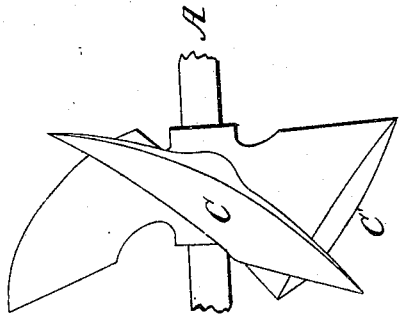

Figure 1, is a stern view of the wheel. Fig. 2, is a front view. Fig. 3, is a side view, in which A, indicates the forward end of the wheel. Fig. 4, is a view of one of the wings, looking from the edge toward the center of the shaft, and also a section of the wing.

Figure 5:
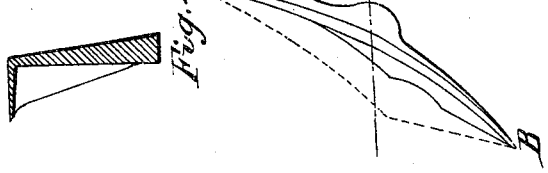

The wheel proper consists of a hub and three wings, all of which are constructed upon the same general plan—that is, all three of the wings are alike. These wings are also called paddles. The outer edge of the wing is formed upon a true circle, as seen at A, B, Fig. 4. In this view, a flange, hereafter to be described, is not represented. In Fig. 2, the face of the wing is represented, and the wings are so formed and placed upon the hub, or shaft, that a radius passing from the center of the hub or shaft, will cut the entire face of the wing to its circumference, as indicated by the lines R, L, in Fig. 2. The wing does not form the segment of a screw, but the curve, A, B, at the periphery of the wing, is placed at such an angle, in relation to the line of the shaft, that the point of the wing will enter the water at an angle of about (16°) sixteen degrees, from a line drawn at right angles to the axis of motion and the heel of the wing, leaving the water, at an angle of about (40°) forty degrees from a line drawn at right angles to the axis of motion, as seen in Fig. 5.

Figure 6:
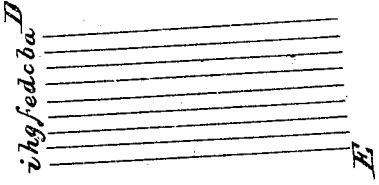

In the construction of screw wheels (commonly called propeller wheels,) the wings, buckets or paddles, when in motion, have a constant tendency to dash the water away from the shaft, at nearly right angles to the face of the wings or buckets. To prevent this, in my improved wheel, I attach to the circumference of the wing, a flange C, Fig. 3, which shows the outside of the flange. At C', the inside of the flange is shown. When the wheel is in motion, this flange keeps the water from moving except in one direction, and that is directly aft. The face of the wings, in my improved wheel are of such a form, being a true curve, that a uniform pressure is kept up against the water in all its parts, or to use a common phrase, the wheel keeps up with the slip of the water. This is what cannot occur in a regular screw wheel, nor by those formed by placing flat paddles obliquely to the line of the shaft. In the screw form every part of the face of the wing presents the same angle to lines drawn at right angles to the axis of the wheel's motion, as is shown in diagram, Fig. 6, in which we will suppose that the lines $a$, $b$, $c$, $d$, $e$ $f$, $g$, $h$, $i$, are atoms or masses of water, the face of a wheel, formed upon the regular screw principle, or of that of flat faced wings, represented by the line D, E, Fig. 6, impinges constantly upon these atoms at a uniform angle throughout the whole extent of the wing. But water is not an immovable solid, but being mobile, is easily displaced, or put in motion, by the wing of the wheel, and hence, a wheel constructed after either of these forms, can act with its full force, only upon the first atom of water it meets, which atom it puts in motion, and this motion is transmitted by the shaft of the wheel, to the vessel, upon the well known law, inertia. But a regular screw wheel, running the whole length of a vessel, would possess little, if any more propelling power, than one whose length only equaled its diameter, and this, too, would be true, of a long shaft, armed at regular intervals with flat wings, standing at a uniform angle to the line of the shaft. The mass of matter of which the vessel is composed, and which is put in motion by the force applied to the wheel, just equals (minus the friction of the machinery) the mass of water put in motion by the propeller wheel, but the effective force is always in a direct line with the course of the vessel, consequently, all water that is put in motion in any other direction—that is, obliquely or at right angles to the course of the vessel—has consequently caused a loss, or waste of power. All propeller wheels hitherto constructed, tend more or less, thus to throw the water at right angles, or obliquely to the course of the vessel, but this tendency thus to displace water, or put it in motion in a wrong direction, I have obviated by the peculiar curve of my wing, and the introduction of the flange C, and by which means I produce a new result, and that result is, to cause the water to leave the wheel only in one direction, and that directly astern, thus giving more effective force to the propelling power.

Another advantage my improvement has over all propeller wheels hitherto constructed, consists in forming the periphery of the wing, in a true circle, and in placing it at such an angle upon the line of the shaft, that the sum of the pressure upon the forward and after part of the wing shall be exactly balanced—in other words, that the after half of the wing shall keep up with the slip of the water. If the wing of a propeller wheel presents the same angle in all its parts to the water, reckoning from a line drawn at right angles to the line of the shaft, then the forward half of the wing must sustain a greater amount of pressure than is sustained by the after half. The reason of this is obvious, but it has nevertheless hitherto escaped the observation of those engineers and builders who have given their attention to the construction of this class of wheels. The philosophy of this subject is clearly shown in diagram Fig. 5, in which the line $k, l, m, n, o, p, q, r, s, t, u,$ represent atoms or masses of water, which is supposed to be in a state of rest, when first acted upon by the wings of the propeller wheel, one of which wings is represented by the curved line G, H. The moment the wing of the wheel impinges upon a mass or atom of water, that mass or atom is put in motion, and if this motion is directly aft, the force applied to the water is communicated to the vessel. We will suppose then that the face of the wing is divided into a certain number of uniform and equal parts, indicated by the numbers 1, 2, 3, 4, 5, 6, in Fig. 5. The mass of water from $o$, to $p$, is put in motion by the first section of the wing, as shown in Fig. 5. Now the first section enters the water at an angle of 16°, and the water having acquired a motion or "slip" astern equal to that of the wheel forward, it follows that section second of the wing must present an angle greater than 16°, in order to act upon the water $o, p$, which has now passed astern to the position of $p, q$. Here also, the water from $p$, to $q$, having received a still greater impetus, cannot be overtaken by the next section 3, of the wing unless that section presents a still greater angle than that presented by section 2, and so on through the whole series of sections. Therefore, the several masses of water, represented from $o$, to $u$, Fig. 5, acquire an increased velocity astern, as is indicated by the increasing distance between the lines, but the increased angle of the curved wing gives a perfect uniformity of pressure to all parts of the wings of the wheel, for every section acts constantly on water having an accelerated motion.

The curve of the wings for a wheel of nine feet in diameter should have a radius of about 20 feet, and the angle at which they should be placed upon the shaft should be as here given, the average, or line drawn from the tip G, to the heel H, being about 30°. This will cause the tip of the wing to strike the water at an angle of 16°, and the heel of the wing to leave the water at about 40°.

This arrangement has been the result of a long series of experiments, by which I have been enabled to demonstrate the leading features herein set forth, but I do not intend to confine myself to the particular angle or lead herein set forth, but to vary it according to the size of the vessel, and the force of the engine.

What I claim as my improvement and desire to secure by Letters Patent, is—

1. The herein described form of wing, for propeller wheels, the periphery of which is formed upon a true circle, as seen at A, B, Fig. 4, and placed at such an angle upon the shaft, that the pressure upon the water, when in motion, shall be exactly equal, upon the forward and after half of the wing, or upon either side of a radial line drawn from the center of the shaft, and at right angles thereto; which line is represented at R, L, Fig. 2, the wings being so placed upon the shaft, that this line shall cut the face of the wing as specified.

2. I also claim the flange C, Fig. 3, attached to the periphery of the wing of the propeller wheel for the purpose of preventing the water from dashing off at right angles or obliquely to the shaft: and causing the water put in motion by the wings of the wheel, to move directly aft in an unbroken column, when used in connection with the form of wing herein described, and operating in the manner set forth.

D. E. MERRICK.

Witnesses:
 I. BRAINERD,
 A. KENDALL.